(12) United States Patent
Rao

(10) Patent No.: US 12,417,551 B2
(45) Date of Patent: Sep. 16, 2025

(54) TARGET DETECTION METHOD BASED ON HETEROGENEOUS PLATFORM, AND TERMINAL DEVICE AND STORAGE MEDIUM

(71) Applicant: BOE TECHNOLOGY GROUP CO., LTD., Beijing (CN)

(72) Inventor: Tianmin Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 483 days.

(21) Appl. No.: 17/927,216

(22) PCT Filed: May 28, 2020

(86) PCT No.: PCT/CN2020/093015
§ 371 (c)(1),
(2) Date: Nov. 22, 2022

(87) PCT Pub. No.: WO2021/137608
PCT Pub. Date: Dec. 2, 2021

(65) Prior Publication Data
US 2023/0206485 A1 Jun. 29, 2023

(51) Int. Cl.
*G06K 9/00* (2022.01)
*G06T 7/62* (2017.01)
(Continued)

(52) U.S. Cl.
CPC .................. *G06T 7/73* (2017.01); *G06T 7/62* (2017.01); *G06V 10/25* (2022.01); *G06V 10/44* (2022.01);
(Continued)

(58) Field of Classification Search
CPC ... G06T 7/73; G06T 7/62; G06T 2207/30242; G06T 1/20; G06V 10/25; G06V 10/44;
(Continued)

(56) References Cited

FOREIGN PATENT DOCUMENTS

| CN | 110046586 A | * | 7/2019 | ........... G06F 18/214 |
| CN | 110298819 A | * | 10/2019 | ....... G05B 19/41875 |

(Continued)

*Primary Examiner* — Xin Jia
(74) *Attorney, Agent, or Firm* — WHDA, LLP

(57) ABSTRACT

Disclosed are a target detection method based on a heterogeneous platform, a terminal device and a storage medium. A specific implementation solution is as follows: a first processor receives a video stream image, and is able to first determine a number of targets in an $N^{th}$-frame image when performing target detection on an $(N+K)^{th}$-frame image in the video stream image; when the number of targets in the $N^{th}$-frame image is greater than or equal to a target threshold, the first processor is able to send the pre-processed $(N+K)^{th}$-frame image to a second processor, so that the second processor cooperates with the first processor to complete target detection on the $(N+K)^{th}$-frame image; and when the number of targets in the $N^{th}$-frame image is less than the target threshold, the first processor is able to perform target detection on the $(N+K)^{th}$-frame image individually.

13 Claims, 4 Drawing Sheets

(51) Int. Cl.
*G06T 7/73* (2017.01)
*G06V 10/25* (2022.01)
*G06V 10/44* (2022.01)

(52) U.S. Cl.
CPC .................. *G06T 2207/30242* (2013.01);
*G06V 2201/07* (2022.01)

(58) Field of Classification Search
CPC .... G06V 2201/07; G06V 10/82; G06V 20/52;
G06V 10/764
See application file for complete search history.

(56) References Cited

FOREIGN PATENT DOCUMENTS

| | | | | | |
|---|---|---|---|---|---|
| CN | 110427998 | A | * | 11/2019 | ........... G06K 9/3233 |
| CN | 110706259 | A | * | 1/2020 | ........... G06N 3/0454 |
| CN | 110827320 | A | * | 2/2020 | ........... G06N 3/0454 |

\* cited by examiner

TARGET DETECTION METHOD BASED ON HETEROGENEOUS PLATFORM, AND TERMINAL DEVICE AND STORAGE MEDIUM

TECHNICAL FIELD

The present disclosure relates to the field of image processing, and in particular, to a target detection method based on a heterogeneous platform, a terminal device, and a computer-readable storage medium.

BACKGROUND

In order to improve the practical application of Artificial Intelligence (AI) technology, multiple processors are embedded with Neural-network Processing Unit (NPU) dedicated to neural network operation. Different from a Central Processing Unit (CPU) of a conventional X86 architecture (X86, computer language instruction set executed by a microprocessor) architecture or an ARM (a 32-bit reduced instruction set architecture) architecture or a Graphics Processing Unit (GPU) based on parallel kernel computation, the NPU is specially designed for convolutional networks and may cope with Convolutional Neural Networks (CNN) computation with high computation complexity.

Therefore, how to detect a target based on multiple processes in the heterogeneous platform has become an urgent problem to be solved.

SUMMARY

The present disclosure provides a target detection method based on a heterogeneous platform, a terminal device and a storage medium, which may solve the technical problem that performances of a processor are reduced when the single processor is used for detecting more targets.

In one aspect, a terminal device is provided, including: a first processor and a second processor, wherein:
the first processor includes a universal calculator and a first memory storing a first target detection model, wherein the universal calculator is configured for: receiving a video stream image, preprocessing an $(N+K)^{th}$-frame image in the video stream image, and sending a pre-processed $(N+K)^{th}$-frame image to the second processor through the first memory when it is determined that a number of targets in an $N^{th}$-frame image in the video stream image is greater than or equal to a target threshold, wherein N and K are positive integers;
the second processor includes a second memory storing a second target detection model, wherein the second processor is configured for: receiving the pre-processed $(N+K)^{th}$-frame image sent by the first memory, extracting a feature point of the $(N+K)^{th}$-frame image based on the second target detection model, and storing the obtained feature point of the $(N+K)^{th}$-frame image in the second memory;
the universal calculator is further configured for: reading the feature point of the $(N+K)^{th}$-frame image from the second memory through the first memory, and determining a target frame in the $(N+K)^{th}$-frame image according to the feature point; and
the universal calculator is further configured for: when it is determined that the number of targets in the $N^{th}$-frame image in the video stream image is less than the target threshold, extracting a feature point of the pre-processed $(N+K)^{th}$-frame image based on the first target detection model stored in the first memory so as to obtain the feature point of the $(N+K)^{th}$-frame image, and determining a target frame in the $(N+K)^{th}$-frame image according to the feature point.

In one aspect, a target detection method based on a heterogeneous platform is provided, wherein the heterogeneous platform includes a first processor and a second processor, and the target detection method includes:
acquiring a video stream image to be detected, and pre-processing, by the first processor, an $(N+K)^{th}$-frame image in the video stream image to be detected;
determining whether a number of targets in an $N^{th}$-frame image in the video stream image is greater than or equal to a target threshold;
if the number of targets in the $N^{th}$-frame image is greater than or equal to the target threshold, sending the pre-processed $(N+K)^{th}$-frame image to the second processor; wherein, the second processor extracts a feature point of the $(N+K)^{th}$-frame image;
acquiring, by the first processor, the feature point of the $(N+K)^{th}$-frame image obtained by the second processor through operation processing;
if the number of targets in the $N^{th}$-frame image is less than the target threshold, extracting, by the first processor, a feature point of the pre-processed $(N+K)^{th}$-frame image to obtain the feature point of the $(N+K)^{th}$-frame image; and
determining a target frame in the $(N+K)^{th}$-frame image according to the feature point of the $(N+K)^{th}$-frame image.

In another aspect, a computer-readable storage medium storing a computer program thereon is provided, wherein the computer program, when executed by a processor, implements the target detection method based on the heterogeneous platform above.

In another aspect, another terminal device is provided, including:
a first processor and a second processor; and
a memory communicatively connected to the first processor and the second processor; wherein,
the memory stores instructions executable by the first processor and the second processor, and the instructions are executed by the first processor and the second processor to enable the first processor and the second processor to execute the target detection method based on the heterogeneous platform above.

Part of the additional aspects and advantages of the present disclosure will be given in part in the following description, and will become apparent in part from the following description, or will be learned through the practice of the present disclosure.

BRIEF DESCRIPTION OF THE DRAWINGS

The above and/or additional aspects and advantages of the present disclosure will become apparent and readily appreciated from the following description of the embodiments with reference to the drawings hereinafter, wherein.

DETAILED DESCRIPTION OF THE EMBODIMENTS

Figure 1:
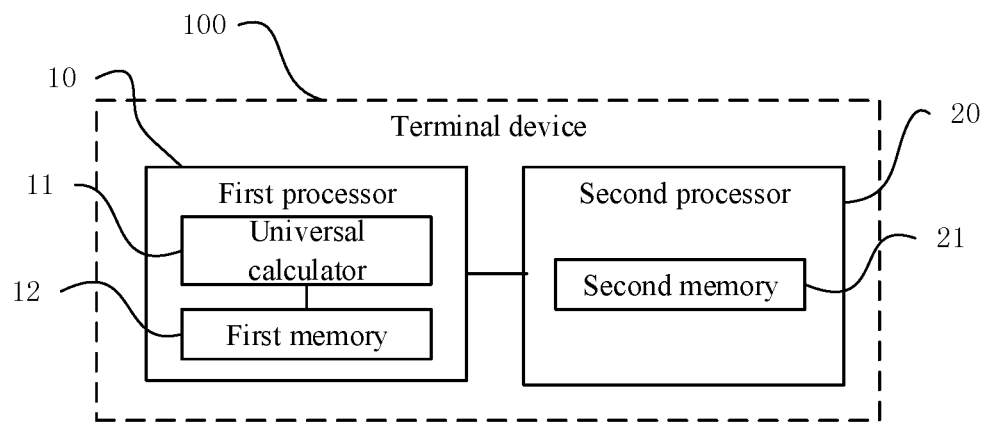
FIG. 1 is a structural block diagram of a terminal device according to one embodiment of the present disclosure.

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present disclosure, but should not be construed as limiting the present disclosure.

It should be noted that deep learning is a popular topic in recent years, and using a deep convolution network CNN (full name in English: Convolution Neural Network) instead of a manually designed operator may extract higher dimensional features to enhance the application of classical machine vision. Whether it is face recognition, pedestrian target detection or gesture recognition, it may be extracted from the network. However, when the complex neural network is used for computing, the computing resources are consumed greatly, and the processing time is high. In practical application, it depends on an expensive server-level GPU for computing. But server-level based operations are often affected by network environments, are less stable, and have network latency. In recent years, in order to improve the practical application of AI technology, multiple processors are embedded with NPU n neural-network processing unit dedicated to neural network operations. Different from the CPU of the conventional x86 or ARM architecture or the GPU based on parallel kernel computation, the NPU is specially designed for the convolutional network and may cope with the CNN computation with high computation complexity. Therefore, how to detect a target based on multiple processes in the heterogeneous platform has become an urgent problem to be solved.

The present disclosure provides a target detection method based on a heterogeneous platform, a terminal device and a computer-readable storage medium, that is, debugging optimization is carried out by adopting a dynamic adjustment mode, multiple processors are adopted for cooperative processing when a number of detected targets is large, which may reduce a running pressure of a single processor, and the single processor is adopted for independent work when a number of people is less, so that power consumption may be reduced.

It may be understood that the heterogeneous platform mainly refers to a computing unit with different types of instruction sets and system architectures, and may be composed of a central processing unit CPU, a graphics processing unit GPU, a Digital Signal Processor (DSP), a neural-network Processor NPU, and other processors. It should be noted that the heterogeneous platform according to the embodiments of the present disclosure may include, but is not limited to, a first processor and a second processor. The first processor is a central processing unit CPU and may function alone, and the second processor is a specific processor and may perform a specific operation. As an example, the second processor may be a graphic processing unit GPU, a neural-network processing unit NPU, and the like, and preferably, the second processor may be a neural-network processing unit NPU.

Specifically, the target detection method based on the heterogeneous platform, the terminal device and the computer-readable storage medium according to the embodiments of the present disclosure are described below with reference to the drawings.

FIG. 1 is a structural block diagram of a terminal device according to one embodiment of the present disclosure. As shown in FIG. 1, the terminal device 100 may include: a first processor 10 and a second processor 20. As shown in FIG. 1, the first processor 10 may include a universal calculator 11 and a first memory 12 storing a first target detection model. The second processor 20 may include a second memory 21 storing a second target detection model. The first processor 10 and the second processor 20 may perform data interaction and scheduling instruction transmission through their respective memories, so as to complete the cooperative work of processors with different architectures.

In the embodiment of the present disclosure, the universal calculator 11 is configured for: receiving a video stream image, preprocessing an $(N+K)^{th}$-frame image in the video stream image, and sending the pre-processed $(N+K)^{th}$-frame image to the second processor 20 through the first memory 12 when it is determined that a number of targets in an $N^{th}$-frame image in the video stream image is greater than or equal to a target threshold, wherein N and K are positive integers; and the second processor 20 is configured for: receiving the pre-processed $(N+K)^{th}$-frame image sent by the first memory 12, extracting a feature point of the $(N+K)^{th}$-frame image based on the second target detection model, and storing the obtained feature point of the $(N+K)^{th}$-frame image in the second memory 21.

In the embodiment of the present disclosure, the universal calculator 11 is further configured for: reading the feature point of the $(N+K)^{th}$-frame image from the second memory 21 through the first memory 12, and determining a target frame in the $(N+K)^{th}$-frame image according to the feature point.

In the embodiment of the present disclosure, the universal calculator is further configured for: when it is determined that the number of targets in the $N^{th}$-frame image in the video stream image is less than the target threshold, extracting a feature point of the pre-processed $(N+K)^{th}$-frame image based on the first target detection model stored in the first memory 12 so as to obtain the feature point of the $(N+K)^{th}$-frame image, and determining a target frame in the $(N+K)^{th}$-frame image according to the feature point.

That is, the universal calculator 11 on the first processor 10 may receive a video stream image to be processed, and pre-process an $(N+K)^{th}$-frame image in the video stream image, wherein the pre-processing may include, but is not limited to, image size adjusting and gray processing, for example, a size of the $(N+K)^{th}$-frame image may be adjusted to a size of an input image required by the first target detection model; for example, if the input image of the first target detection model needs to satisfy a size of 832*832, the size of the $(N+K)^{th}$-frame image may be adjusted to 832*832, and then gray processing is performed on the $(N+K)^{th}$-frame image. Thereafter, the universal calculator 11 may determine whether a number of targets in an $N^{th}$-frame image in the video stream image is greater than or equal to a target threshold, and if yes, the pre-processed $(N+K)^{th}$-frame image may be sent to the second processor 20 through the first memory 12.

The second processor 20 may receive the pre-processed $(N+K)^{th}$-frame image sent by the first memory 12 through the second memory 21, extract a feature point of the $(N+K)^{th}$-frame image based on the second target detection model stored therein, and store the obtained feature point of the $(N+K)^{th}$-frame image in the second memory 21 for the first processor 10 to read. After extracting the feature point of the $(N+K)^{th}$-frame image, the second processor 20 may send an instruction to complete the operation to the first processor 10. After receiving the instruction to complete the operation sent by the second processor 20, the universal calculator 11 in the first processor 10 sends a read command to the second processor 20 to transfer the feature point of the $(N+K)^{th}$-frame image from the second memory 21 of the second processor 20 back to the first memory 12 of the first processor 10. The universal calculator 11 may read the feature point of the $(N+K)^{th}$-frame image from the second memory 21 through the first memory 12, and thereafter, may determine the target frame in the $(N+K)^{th}$-frame image according to the feature point.

In the embodiment of the present disclosure, when it is determined that the number of targets in the $N^{th}$-frame image in the video stream image is less than the target threshold, the first processor 10 may extract the feature point of the pre-processed $(N+K)^{th}$-frame image based on the first target detection model stored in the first memory 12 to obtain the feature point of the $(N+K)^{th}$-frame image, and determine the target frame in the $(N+K)^{th}$-frame image according to the feature point. That is, if it is detected that the number of targets in the top N frames of images exceeds the target threshold, a heterogeneous mode (i.e., the first processor cooperates with the second processor for processing) is used to perform target detection and identification on the next K frames in the video stream, while when the number of targets in the top N frames of images is less, the first processor may be used to perform target detection and identification on the next K frames in the video stream separately. In the embodiment of the present disclosure, the target threshold above may be determined according to a processing performance of the first processor. As an example, in order to ensure the running efficiency of the first processor, it is selected that the target threshold is 5 upon testing. The value of K may be determined according to actual requirements, wherein a value range of K may be [1, (M–N)], that is, the value range of K may be greater than or equal to 1 and less than or equal to (M–N), wherein M is a total frame number of the video stream image.

Figure 2:
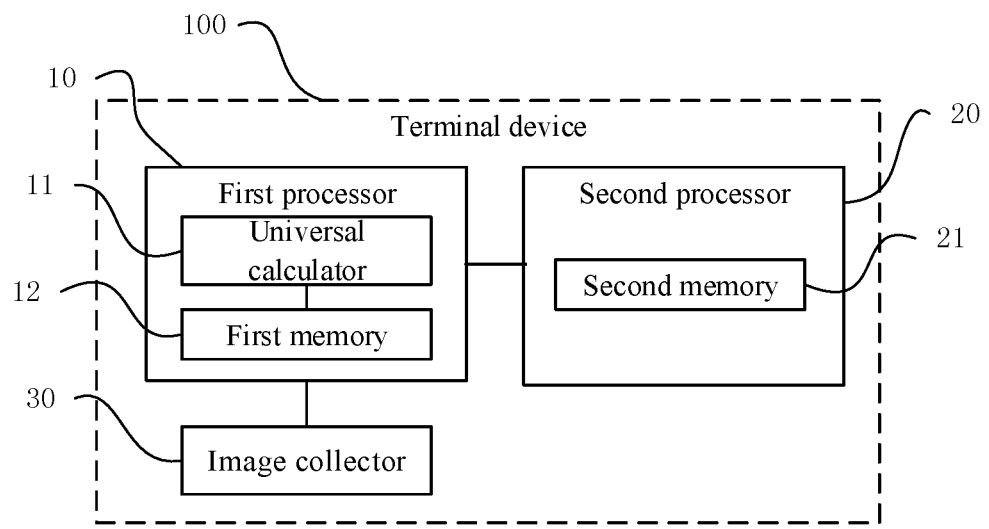
FIG. 2 is a structural block diagram of a terminal device according to another embodiment of the present disclosure.

In some embodiments of the present disclosure, as shown in FIG. 2, the terminal device 100 may further include: an image collector 30. The image collector 30 is configured for collecting a video stream image of a target scene, and sending the collected video stream image to the first memory 12 of the first processor 10 for storage, so that the first processor 10 acquires the video stream image sent by the image collector 30 from the first memory 12, so as to further perform target detection on the video stream image.

It should be noted that when the first target detection model and the second target detection model process images, a plurality of detection frames may appear near the same target, and probabilities of the plurality of detection frames representing them as detection targets are different, wherein the probabilities may be understood as an area scale covering the target. A larger probability indicates a larger area scale covering the target, that is, a larger area scale of the detection frame used for covering the target, while a smaller probability indicates a smaller area scale covering the target, that is, a smaller area scale of the detection frame used for covering the target. For adjacent or close targets, to avoid redundancy of repeated detection, a Non-Maximum Suppression (NMS) algorithm may be added when determining a pedestrian target frame in the image. Optionally, in some embodiments of the present disclosure, the universal calculator 11 is further configured for: acquiring a plurality of detection frames in the $(N+K)^{th}$-frame image according to the feature point of the $(N+K)^{th}$-frame image, wherein the plurality of detection frames are used for indicating different probabilities of a detection target, and the probabilities are used for indicating an area scale covering the target; selecting a detection frame with the maximum probability of the detection target from the plurality of detection frames and determining the detection frame as a standard frame; calculating an overlapping degree of area of non-standard frames and the standard frame in the plurality of detection frames, wherein the non-standard frames refer to the detection frames except the standard frame in the plurality of detection frames; deleting the non-standard frames having the overlapping degree of area with the standard frame exceeding a preset threshold, and reserving the non-standard frames having the overlapping degree of area with the standard frame not exceeding the preset threshold; and determining the standard frame and the reserved non-standard frames as target frames of all targets in the $(N+K)^{th}$-frame image.

That is, the universal calculator 11 may select a detection frame with the largest area scale of the detection frame used for covering the target from the plurality of detection frames, and determine the detection frame as the standard frame. For example, the number of detection frames obtained according to the feature point may be five, such as a detection frame 1, a detection frame 2, a detection frame 3, a detection frame 4 and a detection frame 5. An area scale of the detection frame 1 covering a target 1 is 90%; an area scale of the detection frame 2 covering a target 2 is 80%; an area scale of the detection frame 3 covering a target 3 is 60%; an area scale of the detection frame 4 covering a target 4 is 70%; and an area scale of the detection frame 5 covering a target 5 is 50%. In this case, the detection frame with the largest area scale, for example, the detection frame 1, may be selected from the five detection frames as the standard frame, and the standard frame may be regarded as a target frame of one target in the image to be detected. Then, the universal calculator 11 calculates the overlapping degree of area of the non-standard frames and the standard frame in the plurality of detection frames, when the overlapping degree of area of the non-standard frames and the standard frame exceeds the preset threshold, it is indicated that the compared non-standard frames are a redundant detection frame, and the redundant detection frames are deleted; when the overlapping degree of area of the non-standard frames and the standard frame does not exceed the preset threshold, it is indicated that the detection frame belongs to another target, and in this case, the detection frame needs to be reserved; in this way, it is ensured that the detection frame of the close object is not deleted by mistake while deleting the redundant detection frames.

It may be understood that the plurality of detection frames may belong to the same target, or there may be detection frames that appear because a plurality of targets are too close to each other. For the adjacent or close targets, in order to avoid redundancy of repeated detection, in the embodiment of the present disclosure, the overlapping degree of area of the non-standard frames and the standard frame in the plurality of detection frames may be calculated, wherein the non-standard frames refer to the detection frames except the standard frame in the plurality of detection frames. For example, taking the example given above as an example, after the detection frame 1 is determined to be the standard frame, the overlapping degree of area of the detection frames 2, 3, 4 and 5 with the standard frame (i.e., the detection frame 1) may be calculated respectively. If the overlapping degree is high, the detection frames compared with the standard frame may be directly identified as corresponding to the same target as the standard frame, that is, for different targets that are too close or adjacent, in order to avoid redundancy of repeated detection, the non-standard frames having the overlapping degree of area with the standard frame exceeding the preset threshold may be deleted, while the non-standard frames having the overlapping degree of area with the standard frame not exceeding the preset threshold may be reserved. In this case, the reserved non-standard frames may be used as comparison contents of another target. After all iterative detections are performed, the target frames of all targets in the image to be detected may be determined.

In some embodiments the present disclosure, the universal calculator 11 is further configured for: determining a number of targets in the $(N+K)^{th}$-frame image according to the target frame in the $(N+K)^{th}$-frame image. That is, the universal calculator 11 may identify the number of all the targets in the $(N+K)^{th}$-frame image according to the target frame in the $(N+K)^{th}$-frame image.

It should be noted that in the present disclosure, the number of targets in the $N^{th}$-frame image determines whether the target detection is performed by the first processor alone or whether the target detection is performed cooperatively by the first processor and the second processor. The number of targets in the $N^{th}$-frame image may be determined by the first processor alone. Particularly, in some embodiments of the present disclosure, the universal calculator 11 is further configured for: pre-processing the $N^{th}$-frame image in the video stream image; extracting a feature point of the pre-processed $N^{th}$-frame image based on a first target detection model stored in the first memory 12 to obtain the feature point of the $N^{th}$-frame image; determining a target frame in the $N^{th}$-frame image according to the feature point of the $N^{th}$-frame image; and determining the number of targets in the $N^{th}$-frame image according to the target frame in the $N^{th}$-frame image.

It may be understood that the number of targets in the $N^{th}$-frame image may also be determined by the second processor in cooperation with the first processor. Particularly, in some embodiments of the present disclosure, the universal calculator 11 is further configured for: pre-processing the $N^{th}$-frame image in the video stream image, and sending the target detection model and the pre-processed $N^{th}$-frame image to the second memory 21 through the first memory 12. The second processor 20 is further configured for: reading the pre-processed $N^{th}$-frame image sent by the first memory 12 from the second memory 21, extracting a feature point of the $N^{th}$-frame image based on the second target detection model to obtain the feature point of the $N^{th}$-frame image, and storing the obtained feature point of the $N^{th}$-frame image to the second memory 21. The universal calculator 11 is further configured for: reading the feature point of the $N^{th}$-frame image from the second memory 21 through the first memory 12, determining a target frame in the $N^{th}$-frame image according to the feature point of the $N^{th}$-frame image, and determining a number of targets in the $N^{th}$-frame image according to the target frame in the $N^{th}$-frame image.

It is worth noting that when the first processor and the second processor are just awakened to perform target detection on the video stream image, model parameters of the target detection model stored in the first memory may be moved to the second memory of the second processor and stored as the second target detection model. In this case, an operation sequence to be performed by the second processor needs to be initialized to inform the second processor of the operation to be performed, and the instruction of this part (wherein, the instruction needs to be sent by the first processor to the second processor when running a program run) is stored in a small microprocessor core built in the second processor. Based on the instruction, the second processor may extract a feature point of an input image by using the target detection model stored on the second processor, thereby assisting the first processor to complete the target detection of the image.

For detecting a video stream of continuous frames, the initialization of the second processor needs to be performed only once, and the purpose of the initialization is also to enable the model parameters of the target detection model stored in the first processor to be moved to the second processor to form and store the second target detection model, so that the second processor may extract a feature point of the image based on the second target detection model to assist the first processor in completing the detection of the target in the image. When the model parameters of the target detection model stored in the first processor and an instruction containing the operation sequence are initialized to the second processor, the work of the first processor is released. After the first processor sends the packaged data to the second processor, the second processor independently completes the reasoning calculation of the whole neural network. The calculation result is temporarily stored in storage space (i.e., a second storage block) of the second processor for the first processor to read. After receiving the instruction to complete the operation from the second processor, the first processor sends the read command to the second processor, and returns the result from the memory of the second processor to the memory of the first processor, so as to continue the subsequent post-processing operation, for example, determining the target frame of the target in the image based on the feature point in the image, and then determining the number of all targets included in the image based on the target frame.

It should be noted that, in some embodiments of the present disclosure, the first target detection model and the second target detection model may be Yolov3 (You Only Look Onece, a target detection algorithm) algorithm, and the basic idea is that: the input image is divided into S*S individual cells, and if center coordinates of a certain target fall within a certain cell, the target is predicted from the cell, each cell may predict a corresponding bounding box to frame the detected target.

In order to simplify the calculation steps and reduce the calculation cost, in some embodiments of the present disclosure, the first target detection model and the second target detection module may be Tiny-Yolov3. Compared with Yolov3, the Tiny version compresses the network a lot, without using a Res layer, but only using two Yolov output layers of different scales. The overall idea may be learned from Yolov3. In the embodiment of the present disclosure, a size of the input image of the Tiny-Yolov3 model is 832*832, the model training results are from training results disclosed from a VOC data set. The realized model is light after conversion, which is only less than 10 MB, and is suitable for deployment in a terminal device. This realized model is based on a Tensorflow framework, and featured by light weight, which may correspond to the detection demand of the terminal device well after tool quantization in deployment.

In order to implement the above embodiments, the present disclosure further provides a target detection method based on a heterogeneous platform. It should be noted that the target detection method based on the heterogeneous platform according to the embodiments of the present disclosure may be applied to the terminal device according to the embodiments of the present disclosure. It should be noted that, in an embodiment of the present disclosure, the terminal device may include an image acquisition module configured for collecting a video image of a target scene, and a multi-core heterogeneous based heterogeneous platform. The heterogeneous platform includes a first processor and a second processor. As an example, the first processor may be a central processing unit CPU, and the second processor may be a central processing unit CPU, a graphic processing unit GPU, a neural-network processing unit NPU, and the like, and preferably, the second processor may be a neural-network processing unit NPU. It should be noted that the target detection method according to the embodiment of the present disclosure is described from the first processor side.

Figure 3:
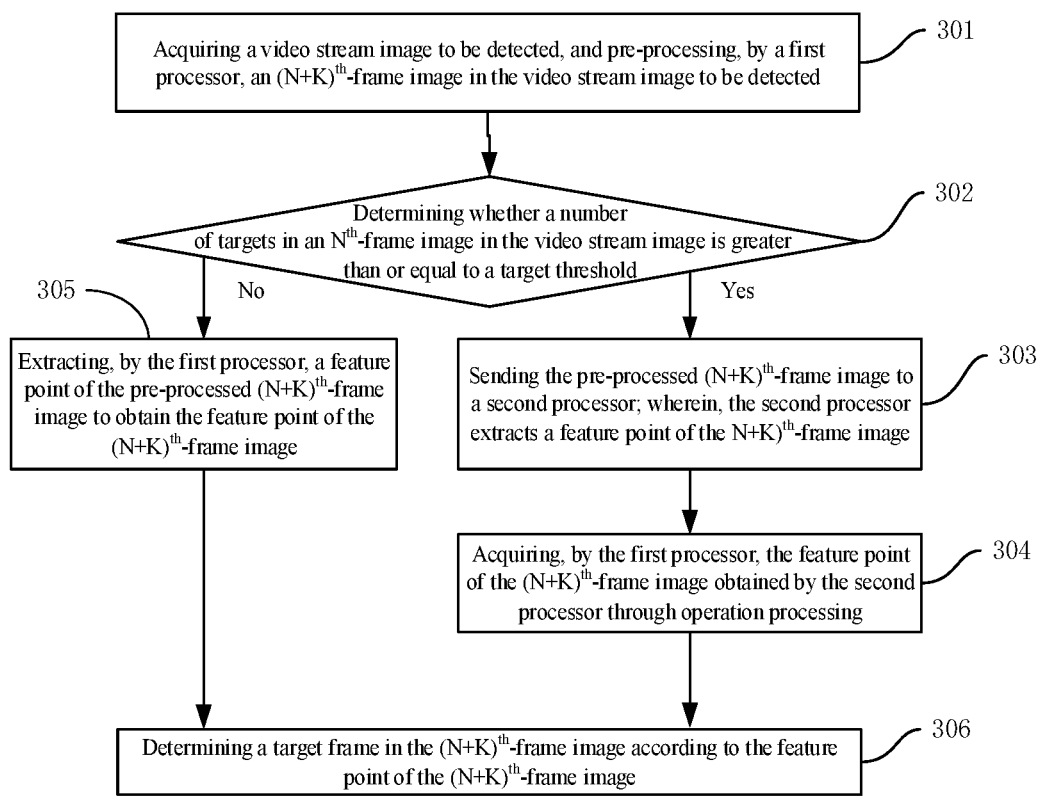
FIG. 3 is a flow chart of a target detection method based on a heterogeneous platform according to one embodiment of the present disclosure.

As shown in FIG. 3, the target detection method based on the heterogeneous platform may include:

Step 301: acquiring a video stream image to be detected, and pre-processing, by the first processor, an $(N+K)^{th}$-frame image in the video stream image to be detected.

In the embodiment of the present disclosure, the video stream image to be detected may be a video stream image that is shot in advance, or a video stream image that is collected in real time by an image collector. For example, it is assumed that the target detection method based on the heterogeneous platform according to the embodiment of the present disclosure is applied to a terminal device of a digital smart billboard, and the terminal device is provided with an image collector. The video stream image of the target scene may be collected by the image collector in a video collection mode, and the video stream image collected in real time may be used as the video stream image to be detected, so as to obtain the video stream image to be detected.

After the video stream image to be detected is obtained, target detection may be performed on the video stream image. When target detection is performed on the $(N+K)^{th}$-frame image in the video stream image, the first processor may pre-process the $(N+K)^{th}$-frame image first, so that the pre-processed $(N+K)^{th}$-frame image may meet the input requirement of the target detection model. For example, the pre-processing may include, but is not limited to, image size adjusting and gray processing, for example, a size of the $(N+K)^{th}$-frame image may be adjusted to a size of an input image required by a first target detection model; for example, if the input image of the first target detection model needs to satisfy a size of 832×832, the size of the $(N+K)^{th}$-frame image may be adjusted to 832×832, and then gray processing is performed on the $(N+K)^{th}$-frame image, thus obtaining the pre-processed $(N+K)^{th}$-frame image.

Step 302: determining whether a number of targets in the $N^{th}$-frame image in the video stream image is greater than or equal to a target threshold. If yes, step 303 is executed; and if not, step 305 is executed.

After pre-processing the $(N+K)^{th}$-frame image and before performing target detection on the $(N+K)^{th}$-frame image by using a target detection model, the total number of all targets in the $(N+K)^{th}$-frame image may be determined first, and it may be determined whether the total number of all targets in the $N^{th}$-frame image is greater than or equal to the target threshold; if yes, step 303 is executed; and if not, step 305 is executed.

Step 303: sending the pre-processed $(N+K)^{th}$-frame image to the second processor; wherein, the second processor extracts a feature point of the $(N+K)^{th}$-frame image.

It should be noted that when the terminal device uses the target detection method according to the embodiments of the present disclosure to detect the video stream image, the second processor needs to be initialized first, that is, model parameters of the target detection model stored in the first processor are moved to the second processor and stored as the second target detection model, so that the second processor may extract a feature point of the image based on the second target detection model to assist the first processor in completing the detection of the target in the image. For detecting a video stream of continuous frames, the initialization of the second processor needs to be performed only once.

In the embodiment of the present disclosure, when the first processor judges that the number of targets in the $N^{th}$-frame image is greater than or equal to the target threshold, that is, the number of targets in the captured scene is large, the first processor may send the pre-processed $(N+K)^{th}$-frame image to the second processor. After receiving the pre-processed $(N+K)^{th}$-frame image sent by the first processor, the second processor may extract the feature point of the $(N+K)^{th}$-frame image by using the second target detection model on the second processor, and store the extracted feature point for the first processor to read.

Step 304: acquiring, by the first processor, the feature point of the $(N+K)^{th}$-frame image obtained by the second processor through operation processing.

In the embodiment of the present disclosure, after receiving an instruction to complete operation from the second processor, the first processor may send a read command to the second processor, and return the feature point of the $(N+K)^{th}$-frame image from a memory of the second processor to a memory of the first processor, so as to continue the subsequent post-processing operation, for example, determining the target frame of the target in the image based on the feature point in the image, and then determining the number of all targets included in the image based on the target frame.

Step 305: extracting, by the first processor, a feature point of the pre-processed $(N+K)^{th}$-frame image to obtain the feature point of the $(N+K)^{th}$-frame image.

In the embodiment of the present disclosure, when the first processor judges that the number of targets in the $N^{th}$-frame image is less than the target threshold, the first processor may extract the feature point of the $N^{th}$-frame image by using the first target detection model stored in the first processor.

Step 306: determining a target frame in the $(N+K)^{th}$-frame image according to the feature point of the $(N+K)^{th}$-frame image.

That is, after obtaining the feature point of the $(N+K)^{th}$-frame image, the first processor may determine the target frame in the $(N+K)^{th}$-frame image according to the feature point of the $(N+K)^{th}$-frame image.

Figure 4:
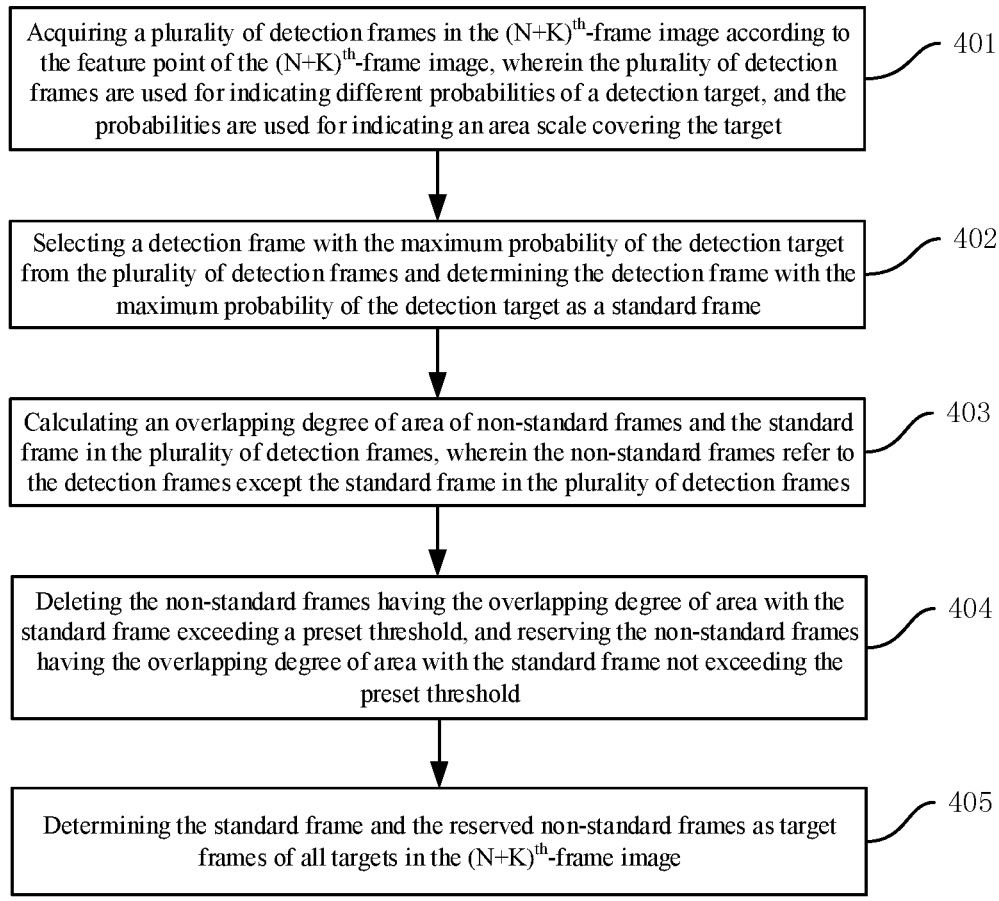
FIG. 4 is a flow chart of a target detection method based on a heterogeneous platform according to another embodiment of the present disclosure.

It should be noted that, after neural network processing, a plurality of detection frames may appear near the same target, and probabilities of the plurality of detection frames representing them as detection targets are different, wherein the probabilities may be understood as an area scale covering the target. A larger probability indicates a larger area scale covering the target, that is, a larger area scale of the detection frame used for covering the target, while a smaller probability indicates a smaller area scale covering the target, that is, a smaller area scale of the detection frame used for covering the target. For adjacent or close targets, in order to avoid redundancy of repeated detection, an NMS algorithm may be added when determining a pedestrian target frame in the image. Optionally, in some embodiments of the present disclosure, as shown in FIG. 4, the specific implementation process of determining the target frame in the $(N+K)^{th}$-frame image according to the feature point of the $(N+K)^{th}$-frame image may be as follows:

Step 401: acquiring a plurality of detection frames in the $(N+K)^{th}$-frame image according to the feature point of the $(N+K)^{th}$-frame image, wherein the plurality of detection frames are used for indicating different probabilities of a detection target, and the probabilities are used for indicating an area scale covering the target.

In this embodiment, the probability may be understood as a size of the area scale covering the pedestrian target, for example, a larger probability indicates a larger area scale covering the target, that is, a larger area scale of the detection frame used for covering the target, while a smaller probability indicates a smaller area scale covering the target, that is, a smaller area scale of the detection frame used for covering the target.

Step 402: selecting a detection frame with the maximum probability of the detection target from the plurality of detection frames and determining the detection frame with the maximum probability of the detection target as a standard frame.

That is, the first processor may select a detection frame with the largest area scale of the detection frame used for covering the target from the plurality of detection frames, and determine the detection frame as the standard frame. For example, the number of detection frames obtained by the first processor according to the feature point may be five, such as a detection frame 1, a detection frame 2, a detection frame 3, a detection frame 4 and a detection frame 5. An area scale of the detection frame 1 covering a target 1 is 90%; an area scale of the detection frame 2 covering a target 2 is 80%; an area scale of the detection frame 3 covering a target 3 is 60%; an area scale of the detection frame 4 covering a target 4 is 70%; and an area scale of the detection frame 5 covering a target 5 is 50%. In this case, the detection frame with the largest area scale, for example, the detection frame 1, may be selected from the five detection frames as the standard frame, and the standard frame may be regarded as a target frame of one target in the image to be detected.

Step 403: calculating an overlapping degree of area of non-standard frames and the standard frame in the plurality of detection frames, wherein the non-standard frames refer to the detection frames except the standard frame in the plurality of detection frames.

Step 404: deleting the non-standard frames having the overlapping degree of area with the standard frame exceeding a preset threshold, and reserving the non-standard frames having the overlapping degree of area with the standard frame not exceeding the preset threshold.

That is, when the overlapping degree of area of another detection frame with the standard frame exceeds the preset threshold, it is indicated that the compared detection frame is a redundant detection frame, and the redundant detection frame is deleted. When the overlapping degree of area of another detection frame with the standard frame does not exceed the preset threshold, it is indicated that the detection frames belong to another object, and in this case, the compared detection frame needs to be reserved; in this way, it is ensured that the detection frame of the close object is not deleted by mistake while deleting the redundant detection frames.

Step 405: determining the standard frame and the reserved non-standard frames as target frames of all targets in the $(N+K)^{th}$-frame image.

It may be understood that the plurality of detection frames may belong to the same target, or there may be detection frames that appear because a plurality of targets are too close to each other. For the adjacent or close targets, in order to avoid redundancy of repeated detection, in this embodiment, the overlapping degree of area of the non-standard frames and the standard frame in the plurality of detection frames may be calculated, wherein the non-standard frames refer to the detection frames except the standard frame in the plurality of detection frames. For example, taking the example given in step 402 as an example, after the detection frame 1 is determined to be the standard frame, the overlapping degree of area of the detection frames 2, 3, 4 and 5 with the standard frame (i.e., the detection frame 1) may be calculated respectively. If the overlapping degree is high, the detection frames compared with the standard frame may be directly identified as corresponding to the same target as the standard frame, that is, for different targets that are too close or adjacent, in order to avoid redundancy of repeated detection, the non-standard frames having the overlapping degree of area with the standard frame exceeding the preset threshold may be deleted, while the non-standard frames having the overlapping degree of area with the standard frame not exceeding the preset threshold may be reserved. In this case, the reserved non-standard frames may be used as comparison contents of another target. After all iterative detections are performed, the target frames of all targets in the image to be detected may be determined.

The target detection method according to the embodiment of the present disclosure may be applied to a scene of detecting a number of targets, for example, a number of pedestrians walking on the street may be detected. In some embodiments of the present disclosure, the number of all the targets in the $(N+K)^{th}$-frame image may be determined according to the target frame in the $(N+K)^{th}$-frame image. One target frame represents one target, so the number of target frames in the $(N+K)^{th}$-frame image may be counted, and the number of targets contained in the $(N+K)^{th}$-frame image may be determined based on this number.

It should be noted that in the present disclosure, the number of targets in the $N^{th}$-frame image determines whether the target detection is performed by the first processor alone or whether the target detection is performed cooperatively by the first processor and the second processor. The number of targets in the $N^{th}$-frame image may be determined by the first processor alone. Particularly, in some embodiments of the present disclosure, the first processor may pre-process the $N^{th}$-frame image in the video stream image, extract a feature point of the pre-processed $N^{th}$-frame image based on a first target detection model stored to obtain the feature point of the $N^{th}$-frame image, and then, determine a target frame in the $N^{th}$-frame image according to the feature point of the $N^{th}$-frame image, and determine the number of targets in the $N^{th}$-frame image according to the target frame in the $N^{th}$-frame image. N may be 1, that is, when a video stream image is received, the first processor may pre-process a first frame image in the video stream image, extract a feature point of the first frame image and determine a number of targets, and then, may determine whether the following one or more frames of images should be processed by the first processor alone or whether the target detection is performed cooperatively by the first processor and the second processor based on the number of targets of the first frame image.

It may be understood that the number of targets in the $N^{th}$-frame image may also be determined by the second processor in cooperation with the first processor. Particularly, in some embodiments of the present disclosure, the first processor may pre-process the $N^{th}$-frame image in the video stream image, and send the pre-processed $N^{th}$-frame image to the second processor, wherein the second processor extracts the feature point of the $N^{th}$-frame image based on the second target detection model. After that, the first processor acquires the feature point of the $N^{th}$-frame image obtained by the second processor through operation processing, and determines a target frame in the $N^{th}$-frame image according to the feature point of the $N^{th}$-frame image, and determines a number of targets in the $N^{th}$-frame image according to the target frame in the $N^{th}$-frame image.

Figure 5:
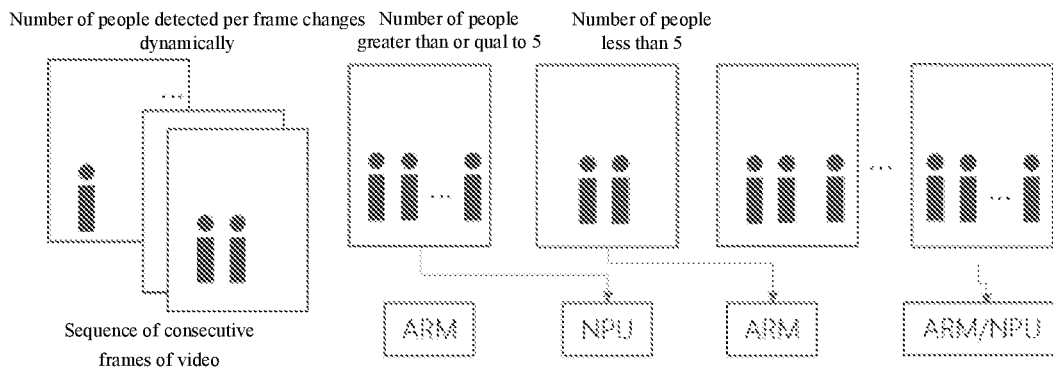
FIG. 5 is an exemplary diagram of the target detection method based on the heterogeneous platform according to the embodiment of the present disclosure.

To sum up, for heterogeneous computation, time loss exists in data transmission between different processors, and when a task load is large, this loss occupies a relatively short processing time of the whole task; when the task load is less, the transmission loss between processors is large due to the reduction in the computation load, which causes redundancy in processing time. To reduce this redundancy and further improve the operating efficiency, the present disclosure carries out dynamic task deployment based on target detection, that is, a designed benchmark strategy thereof is as follows: when the task load is small (that is, a number of detection targets in the current scene is less than a target threshold, for example, 5), a single ARM architecture may be adopted to directly process to achieve target detection; when the task load is large (that is, the number of detection targets in the current scene is greater than or equal to the target threshold), heterogeneous processing may be performed by a co-processing method of a neural-network processing unit NPU to achieve target detection. For example, as shown in FIG. 5, when a video stream is processed, the processor treats the video stream as a sequence of consecutive frames. In a 30 fps video, a time interval of each frame is only 33 ms. In a time scene, there is often less variation in the number of people in the scene during this time interval. When the number of people is greater than or equal to 5, the whole system considers a higher task load. In this case, the processing scheduling deploys the work on the neural-network processing unit NPU, and the actual deployment scheduling is executed for the $(N+K)^{th}$-frame. That is, when a number of targets greater than or equal to 5 is detected in the $N^{th}$-frame, NPU deployment execution is carried out in the $(N+K)^{th}$-frame, a coprocessor scheduling manner is adopted, a neural network model with complex calculation is moved to the neural-network processing unit NPU side, and the same task is processed in a heterogeneous mode, which may reduce the occupation of a CPU memory, and improve the whole corresponding speed of the algorithm. When a number of targets less than 5 is detected in a certain frame, the processing of the $(N+K)^{th}$-frame is returned to the ARM side for processing, so as to avoid redundancy of data transmission between heterogeneous processors and reduce power consumption.

Figure 6:
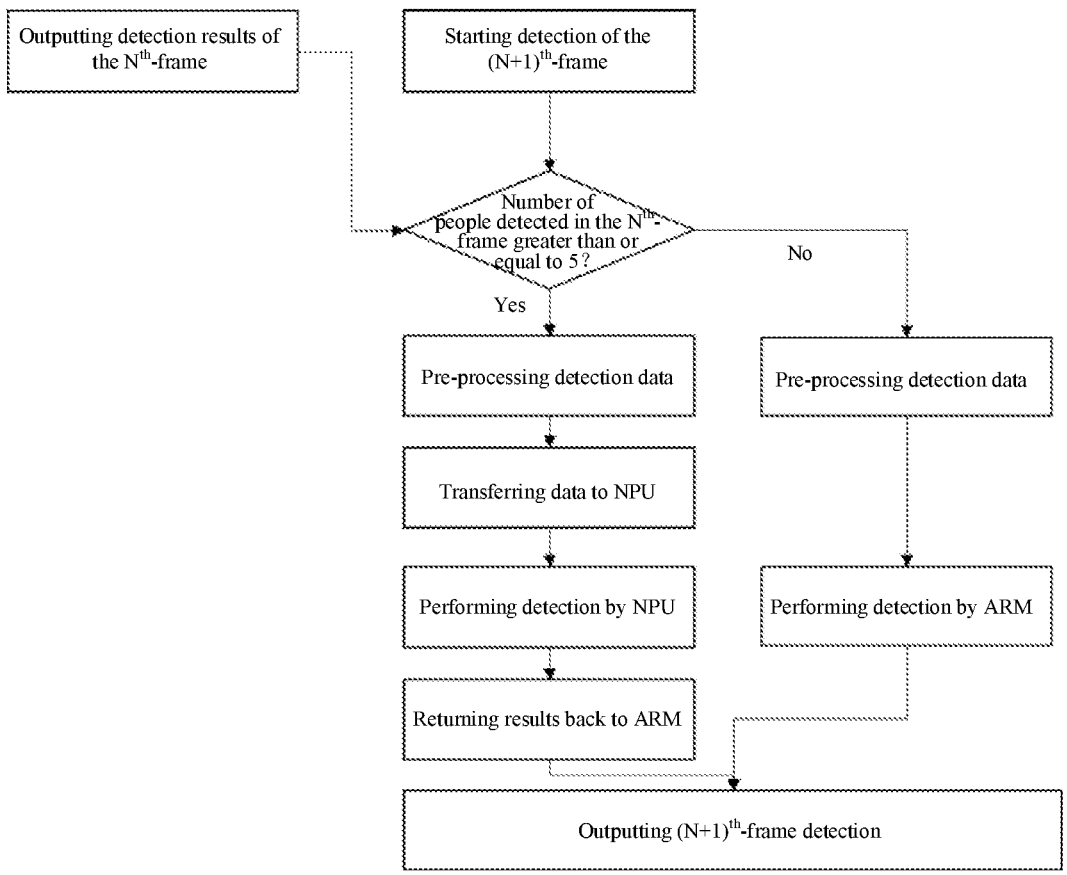
FIG. 6 is an exemplary diagram showing a processing scheduling flow of a dynamic task deployment policy based on target detection according to an embodiment of the present disclosure.

In some embodiments of the present disclosure, the processing scheduling flow of the dynamic task deployment strategy based on target number detection may be shown in FIG. 6, starting from the acquisition of the detection result of the $N^{th}$-frame, and judgment is made first before detecting an $(N+1)^{th}$-frame. If the detection result of the $N^{th}$-frame (the detection result is the number of targets, such as the number of pedestrians) is greater than or equal to 5, the current task is considered as a higher processing cycle, and this calculation is conducted in NPU co-processing mode, and the pre-processed data is imported into NPU to perform high-speed large-task calculation; when the detection result of the $N^{th}$-frame is less than 5, this detection is performed on the current ARM to reduce the data transportation loss in this scene.

Rk3399 Pro may be employed as the heterogeneous platform of the embodiment of the present disclosure. For example, the heterogeneous acceleration platform may use a 6-core ARM chip to perform a main operation, may be configured with a NPU in 3Tops to perform a co-processing operation, and use low-voltage DDR3 with a capacity of 3G as a memory. Based on this, the ARM completes image preprocessing, post-processing and other detection operations, and the NPU performs neural network reasoning calculation. The heterogeneous platform is composed of a RK3399 Pro development board, a display and a camera. The network camera is responsible for collecting data in real time, and the display displays the results through HDMI, so as to verify the feasibility of the overall design. The system used is fedora 28 linux.

In the experiment, a reasoning part of the neural network is compared before and after acceleration. The actual operating performance of the algorithm is as follows, and Logitech C670i with a resolution of 1,080 p and a frame rate of 30 fps is used as the camera. In a VOC data set, an average accuracy rate is 88.62%. This model may detect pedestrian targets standing, facing back or facing the camera sideways. When detecting a road surface, this character is not easy to miss the passing crowds, and may make a better statistical observation over the passing and quantity of pedestrians at an observation site. The experimental results show that when the NPU is used for co-processing, the processing speed is increased from 8.7 fps to 27 fps, and the performances on the terminal side are greatly improved. Meanwhile, in the implementation of the NPU, in order to reduce the computation load, the original 32-bit float data is converted into 8-bit int data for processing during NPU calculation, thus reducing the overall computation load. By performing quantitative processing, a number of bits of the processed data is reduced, which reduces the occupancy rate of the memory, reduces the load of the whole system, improves the overall performances of the detection system, and reduces the occupancy rate of the memory by 50%.

In order to implement the above embodiments, the present disclosure further provides another terminal device.

Figure 7:
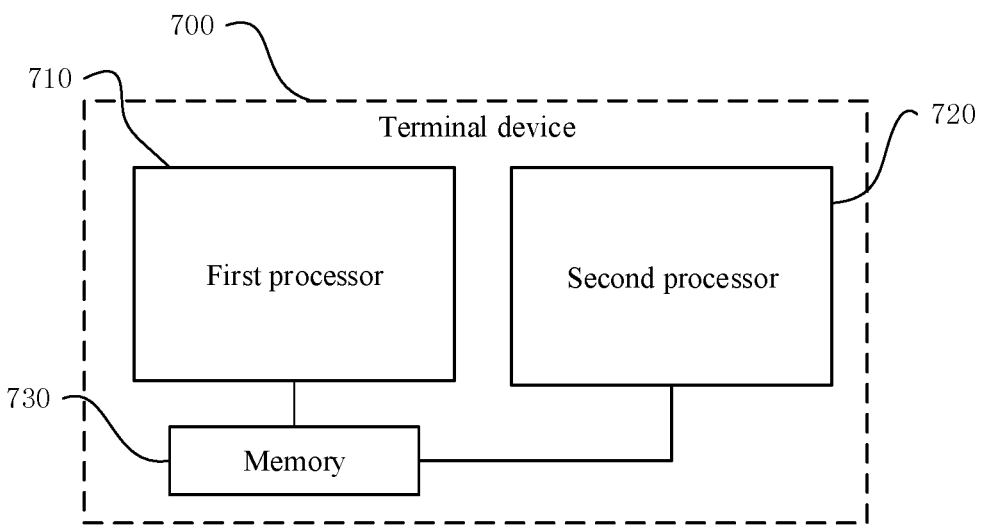
FIG. 7 is a schematic structural diagram of a terminal device according to yet another embodiment of the present disclosure.

FIG. 7 is a structural block diagram of a terminal device according to yet another embodiment of the present disclosure. As shown in FIG. 7, the terminal device 700 may include: a first processor 710, a second processor 720, and a memory 730. The memory 730 is communicatively connected to the first processor 710 and the second processor 720. The memory 730 stores instructions executable by the first processor 710 and the second processor 720, and the instructions are executed by the first processor 710 and the second processor 720, so that the first processor 710 and the second processor 720 may perform the target detection method based on the heterogeneous platforms according to any of the above embodiments of the present disclosure.

In order to implement the foregoing embodiments, the present disclosure further proposes a computer-readable storage medium, on which a computer program is stored, wherein the computer program, when executed by a processor, implements the target detection method based on the heterogeneous platform according to any one of the foregoing embodiments of the present disclosure.

In the description of the present disclosure, it should be understood that the terms "first" and "second" are used for descriptive purposes only and may not be understood as indicating or implying relative importance, or implicitly indicating the number of technical features indicated thereby. Therefore, the features defined with "first" and "second" may explicitly or implicitly include at least one of the features. In the description of the present disclosure, the meaning of "multiple" is two or more than two, such as two, three, and the like, unless otherwise specifically defined.

In the description of this specification, the descriptions to the reference terms "one embodiment", "some embodiments", "examples", "specific examples" or "some examples" mean that the specific features, structures, materials or characteristics described in connection with this embodiment or example are included in at least one embodiment or example of the present disclosure. In the specification, the schematic representation of the above terms does not necessarily mean the same embodiment or example. Moreover, the specific features, structures, materials or characteristics described may be combined in any one or more embodiments or examples in a suitable manner. In addition, without contradicting each other, those skilled in the art may integrate and combine different embodiments or examples and features of different embodiments or examples described in the specification.

Any process or method descriptions in flow charts or otherwise described herein may be understood as representing a module, segment or part of code that includes one or more executable instructions for implementing specific logical functions or steps in the process, and alternate implementations are included within the scope of the preferred embodiments of the present disclosure in which functions may be executed out of order from that shown or discussed, including in a substantially simultaneous manner or in a reverse order according to the functions involved, which should be understood by those skilled in the art to which the embodiments of the present disclosure belong.

The logic and/or steps represented in the flow charts or otherwise described herein, for example, may be considered as an ordered list of executable instructions for implementing logical functions, and may be embodied in any computer-readable medium, for use in an instruction execution system, apparatus, or device (e.g., a computer-based system, a system including a processor, or other system that may read instructions from the instruction execution system, apparatus, or device, and execute the instructions), or may be used in conjunction with such instructions, execute systems, or devices. For this specification, the "computer-readable medium" may be any apparatus that may contain, store, communicate, propagate, or transport a program for use in an instruction execution system, apparatus, or device, or may be used in conjunction with such an instruction execution system, apparatus, or device. More specific examples (non-exhaustive list) of the computer-readable media include the following: an electric connecting portion (electronic device) having one or more wires, a portable computer diskette (magnetic device), a random access memory (RAM), a read-only memory (ROM), an erasable programmable read-only memory (EPROM or flash memory), an optical fiber device, and a portable compact disc read-only memory (CDROM). In addition, the computer readable medium may even be a piece of paper or other suitable medium on which the program may be printed, as it may be optically scanned, for example by paper or other medium, followed by editing, interpretation or other suitable method if appropriate to proceed, so as to obtain the program electronically and then store the program in the computer memory.

It should be understood that portions of the present disclosure may be implemented in hardware, software, firmware or a combination thereof. In the foregoing embodiment, multiple steps or methods may be implemented in software or firmware stored in the memory and executed by a suitable instruction execution system. For example, if the steps or methods are implemented in hardware, as in another embodiment, it may be implemented by any one or combination of the following techniques well known in the art: a discrete logic circuit with a logic gate for implementing logic functions on data signals, an application specific integrated circuit with a suitable combinational logic gate, a programmable gate array (PGA), a field programmable gate array (FPGA), and the like.

Those having ordinary skills in the art should understand that all or a part of the steps of implementing the foregoing embodiments may be implemented by instructing relevant hardware through a program. The program may be stored in a computer-readable storage medium, and when being executed, one or a combination of the steps of the method embodiments is included.

In addition, each functional unit in each embodiment of the present disclosure may be integrated in one processing module, or each unit may exist alone physically, or two or more units may be integrated in one module. The integrated modules above may be implemented in the form of hardware, or in the form of software functional modules. The integrated modules may also be stored in a computer-readable storage medium if being implemented in the form of a software functional module and sold or used as an independent product.

The above-mentioned storage medium may be a read-only memory, a magnetic disk, an optical disk, or the like. Although the embodiments of the present disclosure have been shown and described above, it may be understood that the above embodiments are exemplary and may not be understood as limiting the present disclosure, and those of ordinary skills in the art may make changes, modifications, substitutions and variations to the above embodiments within the scope of the present disclosure.

The invention claimed is:

1. A terminal device, wherein the terminal device comprises: a first processor and a second processor;

the first processor comprises a universal calculator and a first memory storing a first target detection model, wherein the universal calculator is configured for: receiving a video stream image, preprocessing an $(N+K)^{th}$-frame image in the video stream image, and sending a pre-processed $(N+K)^{th}$-frame image to the second processor through the first memory when it is determined that a number of targets in an $N^{th}$-frame image in the video stream image is greater than or equal to a target threshold, wherein N and K are positive integers;

the second processor comprises a second memory storing a second target detection model, wherein the second processor is configured for: receiving the pre-processed $(N+K)^{th}$-frame image sent by the first memory, extracting a feature point of the $(N+K)^{th}$-frame image based on the second target detection model, and storing the obtained feature point of the $(N+K)^{th}$-frame image in the second memory;

the universal calculator is further configured for: reading the feature point of the $(N+K)^{th}$-frame image from the second memory through the first memory, and determining a target frame in the $(N+K)^{th}$-frame image according to the feature point; and the universal calculator is further configured for: when it is determined that the number of targets in the $N^{th}$-frame image in the video stream image is less than the target threshold, extracting a feature point of the pre-processed $(N+K)^{th}$-frame image based on the first target detection model stored in the first memory so as to obtain the feature point of the $(N+K)^{th}$-frame image, and determining a target frame in the $(N+K)^{th}$-frame image according to the feature point.

2. The terminal device according to claim 1, wherein the universal calculator is further configured for:

acquiring a plurality of detection frames in the $(N+K)^{th}$-frame image according to the feature point, wherein the plurality of detection frames are used for indicating different probabilities of a detection target, and the probabilities are used for indicating an area scale covering the target;

selecting a detection frame with the maximum probability of the detection target from the plurality of detection frames and determining the detection frame with the maximum probability of the detection target as a standard frame;

calculating an overlapping degree of area of non-standard frames and the standard frame in the plurality of detection frames, wherein the non-standard frames refer to the detection frames except the standard frame in the plurality of detection frames;

deleting the non-standard frames having the overlapping degree of area with the standard frame exceeding a preset threshold, and reserving the non-standard frames having the overlapping degree of area with the standard frame not exceeding the preset threshold; and determining the standard frame and the reserved non-standard frames as target frames of all targets in the $(N+K)^{th}$-frame image.

3. The terminal device according to claim 1- or 2, wherein the universal calculator is further configured for:

determining the number of targets in the $(N+K)^{th}$-frame image according to the target frames in the $(N+K)^{th}$-frame image.

4. The terminal device according to claim 3, wherein the universal calculator is further configured for:

pre-processing the $N^{th}$-frame image in the video stream image;

extracting a feature point of the pre-processed $N^{th}$-frame image based on the first target detection model stored in the first memory to obtain the feature point of the $N^{th}$-frame image;

determining a target frame in the $N^{th}$-frame image according to the feature point of the $N^{th}$-frame image; and determining a number of targets in the $N^{th}$-frame image according to the target frame in the $N^{th}$ frame image.

5. The terminal device according to claim 3, wherein:

the universal calculator is further configured for: pre-processing the $N^{th}$-frame image in the video stream image, and sending a target detection model and the pre-processed $N^{th}$-frame image to the second memory through the first memory;

the second processor is further configured for: reading the pre-processed $N^{th}$-frame image sent by the first memory from the second memory, extracting a feature point of the $N^{th}$-frame image based on the second target detection model to obtain the feature point of the $N^{th}$-frame image, and storing the obtained feature point of the $N^{th}$-frame image to the second memory; and the universal calculator is further configured for: reading the feature point of the $N^{th}$-frame image from the second memory through the first memory, determining a target frame in the $N^{th}$-frame image according to the feature point of the $N^{th}$-frame image, and determining a number of targets in the $N^{th}$ frame image according to the target frame in the $N^{th}$-frame image.

6. The terminal device according to claim 3, wherein the first processor is a central processing unit and the second processor is a specific processor.

7. A target detection method based on a heterogeneous platform, wherein the heterogeneous platform comprises a first processor and a second processor, and the target detection method comprises:

acquiring a video stream image to be detected, and pre-processing, by the first processor, an $(N+K)^{th}$-frame image in the video stream image to be detected;

determining whether a number of targets in an $N^{th}$-frame image in the video stream image is greater than or equal to a target threshold;

if the number of targets in the $N^{th}$-frame image is greater than or equal to the target threshold, sending the pre-processed $(N+K)^{th}$-frame image to the second processor; wherein, the second processor extracts a feature point of the $(N+K)^{th}$-frame image;

acquiring, by the first processor, the feature point of the $(N+K)^{th}$-frame image obtained by the second processor through operation processing;

if the number of targets in the $N^{th}$-frame image is less than the target threshold, extracting, by the first processor, a feature point of the pre-processed $(N+K)^{th}$-frame image to obtain the feature point of the $(N+K)^{th}$-frame image; and determining a target frame in the $(N+K)^{th}$-frame image according to the feature point of the $(N+K)^{th}$-frame image.

8. The target detection method based on the heterogeneous platform according to claim 7, wherein the determining the target frame in the $(N+K)^{th}$-frame image according to the feature point of the $(N+K)^{th}$-frame image comprises:

acquiring a plurality of detection frames in the $(N+K)^{th}$-frame image according to the feature point of the $(N+K)^{th}$-frame image, wherein the plurality of detection frames are used for indicating different probabilities of a detection target, and the probabilities are used for indicating an area scale covering the target;

selecting a detection frame with the maximum probability of the detection target from the plurality of detection frames and determining the detection frame with the maximum probability of the detection target as a standard frame;

calculating an overlapping degree of area of non-standard frames and the standard frame in the plurality of detection frames, wherein the non-standard frames refer to the detection frames except the standard frame in the plurality of detection frames;

deleting the non-standard frames having the overlapping degree of area with the standard frame exceeding a preset threshold, and reserving the non-standard frames having the overlapping degree of area with the standard frame not exceeding the preset threshold; and determining the standard frame and the reserved non-standard frames as target frames of all targets in the $(N+K)^{th}$-frame image.

9. The target detection method based on the heterogeneous platform according to claim 8, further comprising:

determining a number of targets in the $(N+K)^{th}$-frame image according to the target frame in the $(N+K)^{th}$-frame image.

10. The target detection method based on the heterogeneous platform according to claim 9, further comprising:

pre-processing the $N^{th}$-frame image in the video stream image;

sending the pre-processed $N^{th}$-frame image to the second processor; wherein, the second processor extracts a feature point of the $N^{th}$-frame image based on a second target detection model;

acquiring the feature point of the $N^{th}$-frame image obtained by the second processor through operation processing;

determining a target frame in the $N^{th}$-frame image according to the feature point of the $N^{th}$-frame image; and determining the number of targets in the $N^{th}$-frame image according to the target frame in the $N^{th}$-frame image.

11. The target detection method based on the heterogeneous platform according to claim 9, further comprising:

pre-processing the $N^{th}$-frame image in the video stream image;

extracting a feature point of the pre-processed $N^{th}$-frame image based on a first target detection model to obtain the feature point of the $N^{th}$-frame image;

determining a target frame in the $N^{th}$-frame image according to the feature point of the $N^{th}$-frame image; and determining the number of targets in the $N^{th}$-frame image according to the target frame in the $N^{th}$-frame image.

12. A nonvolatile computer-readable storage medium storing a computer program thereon, wherein the computer program, when executed by a processor, implements the target detection method based on the heterogeneous platform according to claim 7.

13. A terminal device, comprising:

a first processor and a second processor; and a memory communicatively connected to the first processor and the second processor; wherein, the memory stores instructions executable by the first processor and the second processor, and the instructions are executed by the first processor and the second processor to enable the first processor and the second processor to execute the target detection method based on the heterogeneous platform according to claim 7.

* * * * *